United States Patent
Kajimoto (10) Patent No.: US 11,869,454 B2
(45) Date of Patent: Jan. 9, 2024

(54) INFORMATION PROCESSING APPARATUS AND INFORMATION PROCESSING METHOD

(71) Applicant: DENSO TEN Limited, Kobe (JP)

(72) Inventor: Nobuaki Kajimoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/697,536

(22) Filed: Mar. 17, 2022

(65) Prior Publication Data
US 2023/0206880 A1   Jun. 29, 2023

(30) Foreign Application Priority Data
Dec. 24, 2021   (JP) .................. 2021-210660

(51) Int. Cl.
G09G 5/02   (2006.01)
G06F 3/04845   (2022.01)
G06F 3/04817   (2022.01)
G09G 5/10   (2006.01)
G09G 5/00   (2006.01)

(52) U.S. Cl.
CPC ........ *G09G 5/024* (2013.01); *G06F 3/04817* (2013.01); *G06F 3/04845* (2013.01); *G09G 5/003* (2013.01); *G09G 5/10* (2013.01); *G09G 2320/066* (2013.01); *G09G 2340/06* (2013.01)

(58) Field of Classification Search
CPC ......... G09G 5/024; G09G 5/003; G09G 5/10; G09G 2320/066; G09G 2340/06; G09G 5/377; G09G 2340/10; G09G 2340/12; G06F 3/04817; G06F 3/04845; H04N 13/183; G06V 20/635
See application file for complete search history.

(56) References Cited

U.S. PATENT DOCUMENTS

| 8,264,499 | B1* | 9/2012 | Landry | H04N 9/76 715/275 |
| 8,416,262 | B2* | 4/2013 | Saunders | H04N 23/633 345/589 |
| 9,397,844 | B2* | 7/2016 | Howard | G06T 11/60 |
| 2002/0039095 | A1* | 4/2002 | Nakano | H04M 1/72439 345/204 |

FOREIGN PATENT DOCUMENTS

| JP | H09-134159 A | 5/1997 | |
| JP | 2016-099453 A | 5/2016 | |
| WO | WO-2019184017 A1 * | 10/2019 | G06T 5/009 |

* cited by examiner

Primary Examiner — Antonio A Caschera
(74) Attorney, Agent, or Firm — Oliff PLC (57) ABSTRACT

An information processing apparatus includes a controller configured to, when displaying an on-screen display image on a screen of a display device, invalidate a contrast value set by a user to a contrast setting value specifying a contrast of the screen, and draw the on-screen display image so as to be superimposed on a background image.

12 Claims, 4 Drawing Sheets

INFORMATION PROCESSING APPARATUS AND INFORMATION PROCESSING METHOD

CROSS-REFERENCE TO RELATED APPLICATIONS

This application is based upon and claims the benefit of priority from prior Japanese patent application No. 2021-210660, filed on Dec. 24, 2021, the entire contents of which are incorporated herein by reference.

TECHNICAL FIELD

The present disclosure relates to an information processing apparatus and an information processing method.

BACKGROUND ART

Some information processing apparatuses have an on-screen display (OSD) function. The OSD function is a function of displaying a further display region (OSD) on at least a part of a screen of a display device. The OSD is superimposed and displayed on an image provided to a user from an information processing apparatus such as a processing result by the information processing apparatus or a video from a camera, and is used for setting, operation, or the like for the information processing apparatus (for example, see JP-A-9-134159 and JP-A-2016-99453). The OSD is also used in displaying an opening image on a display device that is displayed for a certain period of time immediately after the information processing apparatus is powered on. Hereinafter, an image displayed using the OSD function, such as an opening image, is also referred to as an on-screen display (OSD) image.

SUMMARY OF INVENTION

With the display device having a high resolution and a region such as the OSD displayed on the screen having a certain large size, a problem may occur. For example, the display of the region would fail to be in time when the data from the image storage device is not transferred to the image processing device at a data transfer speed corresponding to the screen size. Therefore, for example, in a case where the OSD image is an opening image, a region where the opening image is displayed is set to be only a part of the screen of the display device (for example, a central portion of the screen), and such an opening image is superimposed and displayed on the background image.

However, in this case, when a contrast of the screen is adjusted by a user, a relationship between the opening image and the background image may become unnatural. For example, in a case where the contrast of the background image is adjusted by the user when the opening image and the background image are black in an initial state of the information processing apparatus, the background image may become light black (gray). In this case, the relationship between the opening image and the background image becomes unnatural.

An aspect of the present disclosure relates to displaying a screen with a natural relationship between an OSD image and a background image on a display device.

According to an aspect of the disclosed embodiment, there is provided an information processing apparatus including a controller configured to, when displaying an on-screen display image on a screen of a display device, invalidate a contrast value set by a user to a contrast setting value specifying a contrast of the screen, and draw the on-screen display image so as to be superimposed on a background image.

According to the information processing apparatus, a screen with a natural relationship between an OSD image and a background image can be displayed on a display device.

DESCRIPTION OF EMBODIMENTS

Hereinafter, an information processing apparatus and an information processing method according to an embodiment will be described with reference to the drawings.

Embodiment (System Configuration)

Figure 1:
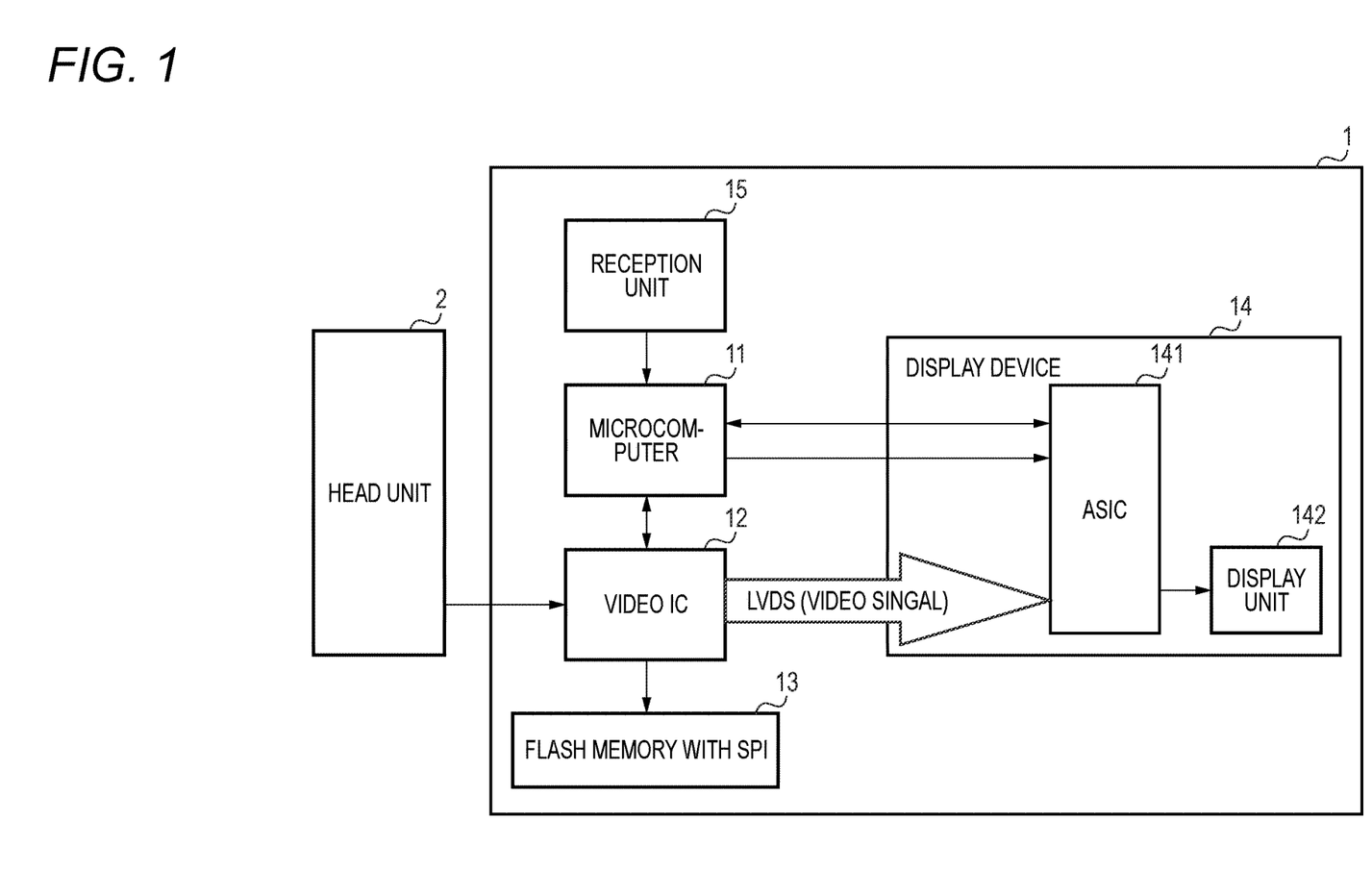
FIG. 1 shows an information processing apparatus according to an embodiment.

FIG. 1 shows an information processing apparatus 1 according to an embodiment. FIG. 1 shows a head unit 2 together with the information processing apparatus 1. The information processing apparatus 1 is, for example, an apparatus called a rear seat entertainment system (RSE) mounted on a vehicle. The RSE provides an occupant with contents such as a television broadcast, and video and sound reproduced from a medium such as a digital versatile disc (DVD) at a rear seat of a vehicle interior. The head unit 2 is a device that provides the occupant with video, sound, a navigation function, and the like at a front seat.

As shown in FIG. 1, the information processing apparatus 1 includes a microcomputer 11, a video integrated circuit (hereinafter, referred to as video IC 12), a flash memory with a serial peripheral interface (SPI) (hereinafter, referred to as flash memory 13), a display device 14, and a reception unit 15.

The microcomputer 11 is called a microcontroller or a microcomputer. The microcomputer 11 includes, for example, a central processing unit (CPU), a main storage unit, and a sub-storage unit. The CPU executes a computer program loaded to be executable in the main storage unit, and provides functions of the information processing apparatus 1. The main storage unit stores the computer program executed by the CPU, data processed by the CPU, and the like. The sub-storage unit stores values set in a register group 124 to be described later. The sub-storage unit is an auxiliary storage device that stores data in a nonvolatile manner, and is, for example, a hard disk, a solid state drive, or a flash memory. The CPU is also called a processor. The CPU is not limited to a single processor, and may have a multiprocessor configuration. The CPU may be a single processor connected by a single socket, and may have a multi-core configuration. With these processes, the microcomputer 11 receives an operation from a user who is an occupant, and provides various functions to the user in response to the operation from the user.

The video IC 12 cooperates with the microcomputer 11 and provides various contents to the user by the RSE. The video IC 12 outputs, for example, a television broadcast received by the head unit 2 or video reproduced by the head unit 2 to the display device 14. The video IC 12 draws a background image based on a value set in the register group 124 to be described later, and outputs the background image to the display device. The video IC 12 acquires on-screen display (OSD) screen data from the flash memory 13, superimposes the OSD screen data on the received television broadcast, the reproduced video, the drawn background image, or the like, and outputs the OSD screen data to the display device 14.

In the present embodiment, the video IC 12 supplies a video signal to the display device 14 by, for example, a low voltage differential signal (LVDS) interface. The interface between the video IC 12 and the display device 14 is not limited to LVDS. For example, the video IC 12 and the display device 14 may be connected by digital RGB, analog RGB, or digital visual interface (DVI). That is, types of interfaces connected between the video IC 12 and the display device 14 are not limited. The video IC 12 and the display device 14 may be connected by any interface as long as data processed by the video IC 12 can be output to the display device 14. The microcomputer 11 and the video IC 12 are examples of a controller.

The flash memory 13 stores the OSD screen data, parameters for changing configurations of the OSD screen data, and the like to be provided to the video IC 12. In the present embodiment, the flash memory 13 communicates with the video IC 12 via the SPI, and provides data such as OSD screen data and parameters to the video IC 12. The OSD screen data includes image data of an opening image displayed on the display device 14 for a certain period of time immediately after the information processing apparatus 1 is powered on. The opening image is an example of an OSD image. In the present embodiment, a device that stores the OSD screen data, the parameters for changing configurations of the screen data, and the like is not limited to the flash memory 13. The information processing apparatus 1 may include a general nonvolatile memory called an electrically erasable programmable read-only memory (EEPROM) instead of the flash memory 13.

In the information processing apparatus 1 of the present embodiment, the connection between the flash memory 13 and the video IC 12 is not limited to the SPI. The connection between the flash memory 13 and the video IC 12 may be, for example, an inter-integrated circuit (I2C) or peripheral component interconnect (PCI) express. The flash memory 13 and the video IC 12 may be connected by a parallel bus. That is, in the present embodiment, types of the interface or bus connected between the flash memory 13 and the video IC 12 are not limited. The flash memory 13 and the video IC 12 may be connected by any interface or any bus as long as data stored in the flash memory 13 can be transferred to the video IC 12.

The display device 14 displays screen data output from the video IC 12. The display device 14 is, for example, an organic electroluminescent display (OELD) or a liquid crystal display (LCD). The display device 14 includes an application specific integrated circuit (ASIC 141) for display, and a display unit 142. The ASIC 141 receives a video signal or the like from the video IC 12 and outputs a drive signal for driving the OELD, the LCD, or the like to the display unit 142. The display unit 142 is a display panel such as an OELD or an LCD, and is driven by a drive signal of the ASIC 141 to display a video.

The reception unit 15 receives an input operation of the user to the information processing apparatus 1, and outputs a signal corresponding to the received input operation to the microcomputer 11. The input operation includes, for example, on/off of the power supply of the information processing apparatus 1, switching of contents to be output to the display device 14, adjustment of image quality, and adjustment of sound volume. The adjustment of image quality includes adjustment of a color and contrast of a background image, which will be described later. The reception unit 15 is, for example, a remote controller, an input button, an input lever, a touch panel superimposed on the display unit 142, a graphics object displayed on the display unit 142, or a combination thereof. The graphics object displayed on the display unit 142 is a user interface component or the like that can be operated by a keyboard or a pointing device.

In the present embodiment, the head unit 2 is not a main component and may be omitted. Further, in the present embodiment, the information processing apparatus 1 is not limited to the RSE, and may be a television apparatus, a video reproduction apparatus, a sound reproduction apparatus, a personal computer, and the like installed at home. In this case, instead of the head unit 2, a reproduction apparatus such as a DVD or a Blu-ray disc may be connected to the information processing apparatus 1. The information processing apparatus 1 may be any apparatus that superimposes an OSD on screen data from a device that supplies contents such as the head unit 2 and outputs the OSD and the screen data to the display device 14 such as an OELD or an LCD.

Figure 2:
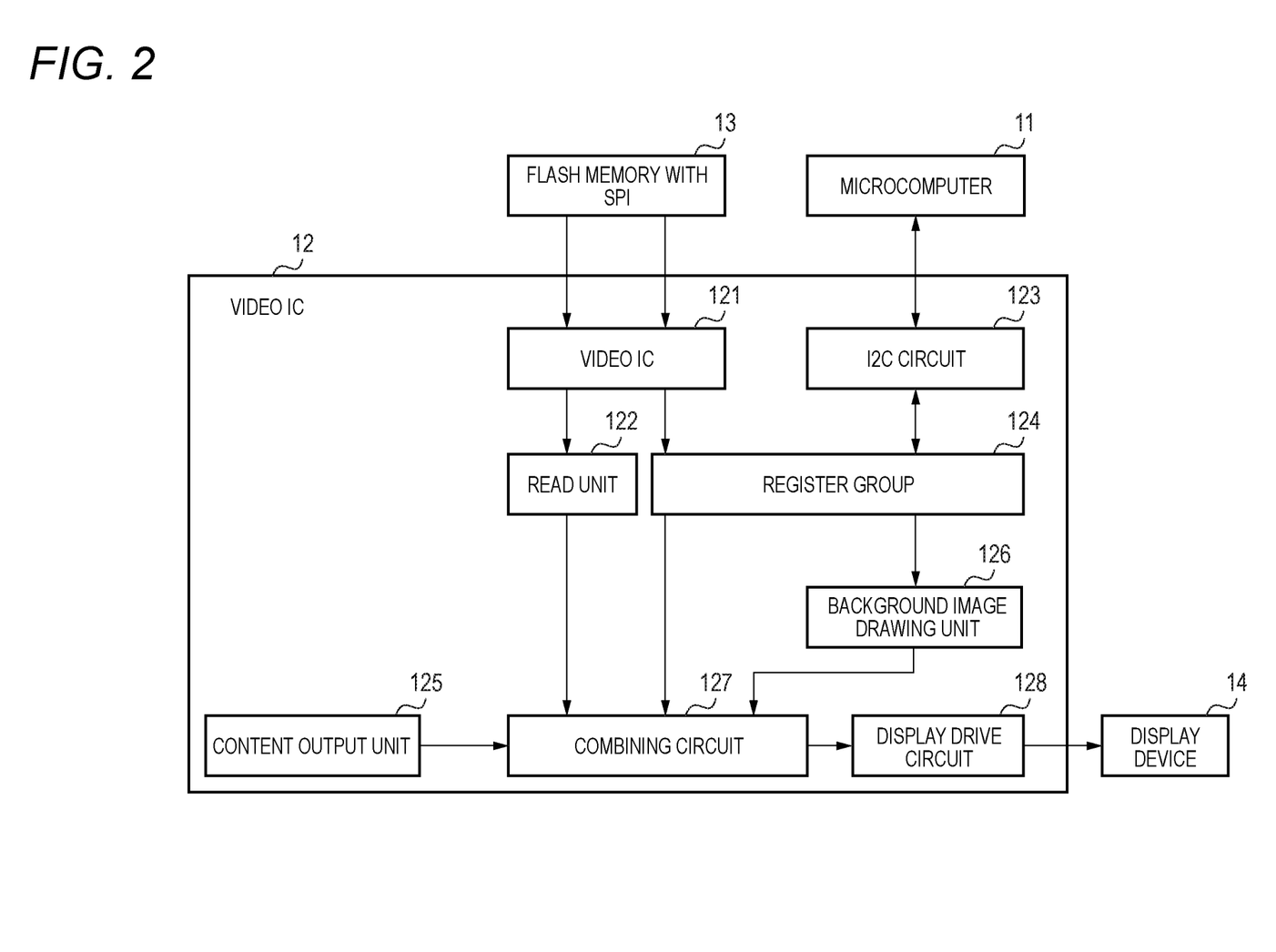
FIG. 2 shows a detailed configuration of a video IC.

FIG. 2 shows a detailed configuration of the video IC 12. FIG. 2 also shows the microcomputer 11, the flash memory 13, and the display device 14. As shown in FIG. 2, the video IC 12 includes an SPI circuit 121, a read unit 122, an I2C circuit 123, a register group 124, a content output unit 125, a background image drawing unit 126, a combining circuit 127, and a display drive circuit 128. Each unit in FIG. 2 is basically a hardware circuit. At least a part of the configuration in FIG. 2 may be provided by a program loaded on a memory and a processor.

The SPI circuit 121 communicates with a SPI circuit provided in the flash memory 13 in accordance with an instruction from the read unit 122, and acquires OSD screen data and the like from the flash memory 13. The SPI circuit 121 transfers the data acquired from the flash memory 13 to the read unit 122.

The read unit 122 acquires the data from the flash memory 13 through the SPI circuit 121. The read unit 122 supplies the acquired OSD screen data and the like to the combining circuit 127.

The content output unit 125 acquires, for example, video data by television broadcasting or video data reproduced from a DVD or the like (also referred to as content data) from the head unit 2, and supplies the content data to the combining circuit 127.

The I2C circuit 123 communicates with the microcomputer 11 and stores setting values from the microcomputer 11 in the register group 124. The register group 124 includes registers that store various control parameters. For example, the register group 124 includes a register for the microcomputer 11 to activate processing by the video IC 12, a register for specifying a clock frequency when the SPI circuit 121 receives data transferred from the flash memory 13, and a register for specifying configurations of the OSD. The register for specifying configurations of the OSD holds, for example, positions of knobs, switches, volumes, indicators, and the like on the OSD, or setting values such as color.

The flash memory 13 and the SPI circuit 121 transfer data via the SPI at a clock frequency corresponding to a parameter specified in the register for specifying the clock frequency in the register group 124.

Among the registers of the register group 124, data is set in at least a part of the register for specifying the configurations of the OSD by direct memory access (DMA) transfer between the video IC 12 and the flash memory 13. With the DMA transfer, data acquired from the flash memory 13 is captured by the register of the register group 124 without interposing the microcomputer 11. The processing of the data transfer from the flash memory 13 to the read unit 122 via the SPI circuit 121 is also a type of processing by the DMA transfer.

The register group 124 also includes a register for specifying configurations of the background image. The register for specifying the configurations of the background image includes a register for background setting and a register for contrast setting, and holds setting values of the color and contrast of the background image. The background image drawing unit 126 draws a background image based on the setting values held in the register for specifying the configurations of the background image, and outputs the background image to the combining circuit 127.

Here, the background image will be described. In the present embodiment, the background image drawing unit 126 draws background images of various colors by setting a color and a contrast (brightness) in the register for specifying the configurations of the background image by an input operation of the user via the reception unit 15. The color includes chromatic colors such as red, blue, and yellow and achromatic colors such as black, gray, and white. In addition, the contrast includes a degree of brightness such as high, medium, and low. For example, when "black" (hereinafter, also referred to as "black image") is set as the color of the background image in the register for background setting, and "low" is set as the contrast of the background image in the register for contrast setting, a black background image is drawn. When "black" is set in the register for background setting, and "medium" is set in the register for contrast setting, a light black background image is drawn. When "black" is set in the register for background setting, and "high" is set in the register for contrast setting, a very light black background image is drawn. When "blue" (hereinafter, also referred to as "blue image") is set in the register for background setting, and "low" is set in the register for contrast setting, a blue background image is drawn. When "blue" is set in the register for background setting, and "medium" is set in the register for contrast setting, a light blue background image is drawn. When "blue" is set in the register for background setting, and "high" is set in the register for contrast setting, a very light blue background image is drawn.

The combining circuit 127 combines content data from the content output unit 125 and background image data from the background image drawing unit 126 with the OSD screen data and the like supplied from the read unit 122. More specifically, among pixels of the screen occupied by the content data and the background image data, the pixels of a region occupied by the OSD screen data are replaced with the OSD screen data.

The combining circuit 127 outputs the combined data to the display drive circuit 128. The display drive circuit 128 converts screen data combined by the combining circuit 127 into data conforming to, for example, a LVDS interface, and outputs the data to the display device 14.

(Processing Flow)

Figure 3:
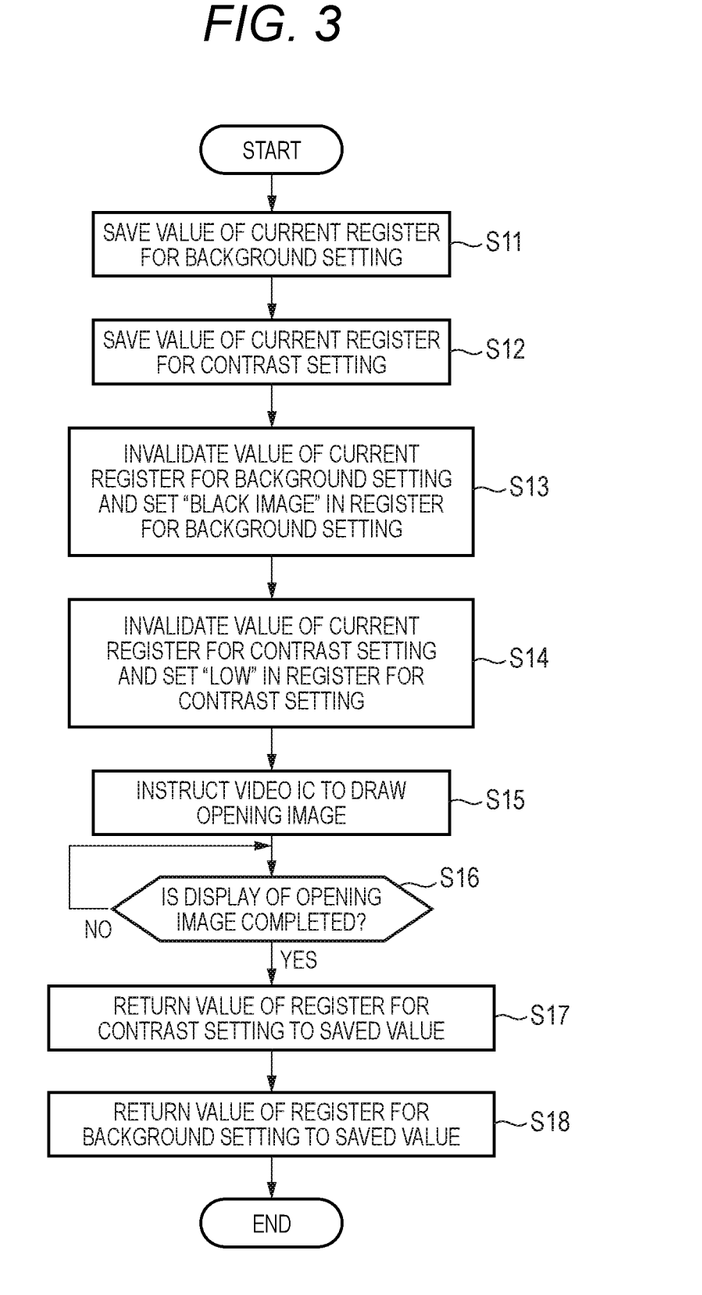
FIG. 3 is a flowchart showing processing of the information processing apparatus according to the embodiment.

FIG. 3 is a flowchart showing processing of the information processing apparatus 1 according to the present embodiment. Specifically, FIG. 3 shows processing of the information processing apparatus 1 when the opening image is superimposed on the background image and displayed on the screen of the display unit 142 of the display device 14. The processing is executed by the microcomputer 11 and the video IC 12. The processing of the video IC 12 is executed by a hardware circuit. The processing of the video IC 12 may also be executed by a processor in accordance with a program on the memory.

Figure 4A:
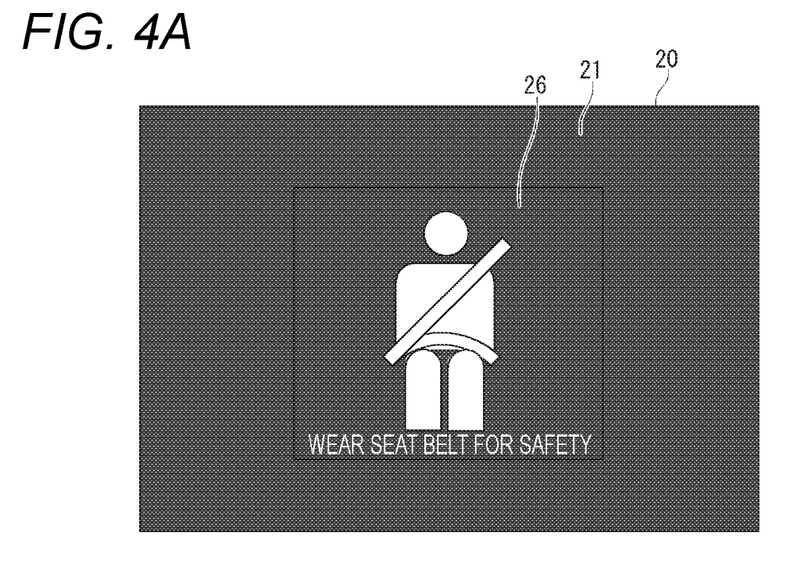
FIGS. 4A and 4B show examples of a background image and an opening image which are displayed on a screen of a display unit of a display device.
Figure 4B:
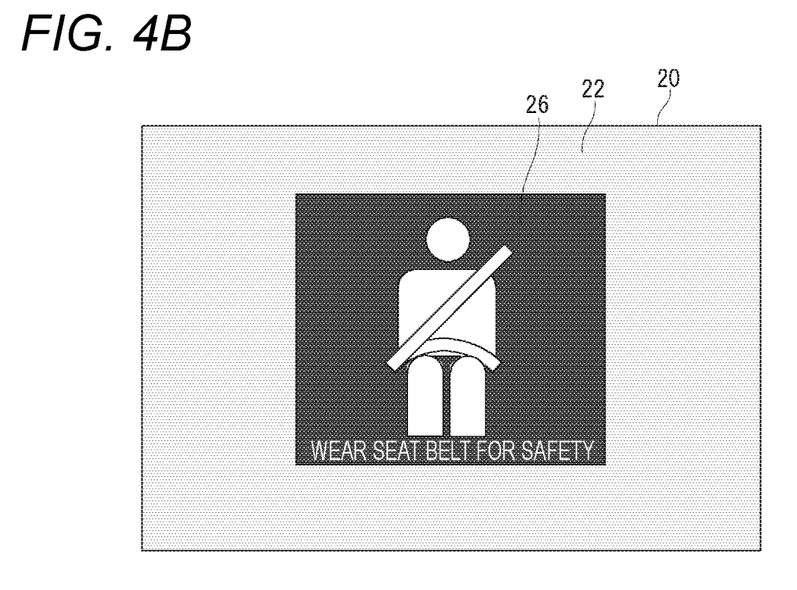

FIGS. 4A and 4B show examples of the background image and the opening image which are displayed on the screen of the display unit 142 of the display device 14. FIG. 4A shows the background image 21 and the opening image 26 which are displayed on the screen of the display unit 142 of the display device 14 by the processing according to the present embodiment. FIG. 4B shows the background image 22 and the opening image 26 which are displayed on the screen 20 of the display unit 142 of the display device 14 by the processing according to Comparative Example.

In this processing, when the information processing apparatus 1 is powered on, the microcomputer 11 first saves the setting values of the current register for background setting in the register group 124 in the sub-storage unit of the microcomputer 11 via the I2C circuit 123 (S11). For example, the value set in the current register for background setting is a value (initial value) specifying the color of the background image 21, which is set in accordance with the color of the opening image 26 before shipment of the information processing apparatus 1 and. Alternatively, the value set in the current register for background setting is a value specifying the color of the background image 21 which is set by the user via the reception unit 15 of the information processing apparatus 1. In the present embodiment, for example, it is assumed that a "black image" is saved as the setting value of the current register for background setting.

Subsequently, the microcomputer 11 saves the setting values of the current register for contrast setting in the register group 124 in the sub-storage unit via the I2C circuit 123 (S12). For example, the value set in the current register for contrast setting is a value (initial value) specifying the contrast of the background image 21, which is set in accordance with the contrast of the opening image 26 before shipment of the information processing apparatus 1. Alternatively, the value set in the current register for contrast setting is a value specifying the contrast of the background image 21 which is set by the user via the reception unit 15 of the information processing apparatus 1. In the present embodiment, for example, "high" is saved as the setting value of the current register for contrast setting.

Next, the microcomputer 11 invalidates the setting values of the current register for background setting in the register group 124 via the I2C circuit 123, and sets the "black image" in the register for background setting (S13). Specifically, first, the microcomputer 11 invalidates the setting values of the current register for background setting. As described above, the setting value of the current register for background setting is "black image". The microcomputer 11 invalidates the setting value "black image". Subsequently, the microcomputer 11 sets a value specifying the color of the background image 21 in the register for background setting based on the image data of the opening image 26 stored in the flash memory 13. For example, as shown in FIG. 4, the opening image 26 is an approximately black image. Therefore, the color of the background image 21 is set to black in accordance with the color of the opening image 26. In this manner, the microcomputer 11 sets the "black image" as the value specifying the color in the register for background setting.

For example, when the opening image 26 is blue, the color of the background image 21 is set to blue in accordance with the color of the opening image 26. In this case, the microcomputer 11 sets the "blue image" in the register for background setting. That is, the image set in the register for background setting is not limited to the "black image".

Subsequently, the microcomputer 11 invalidates the setting values of the current register for contrast setting in the register group 124 via the I2C circuit 123, and sets "low" in the register for contrast setting (S14). Specifically, first, the microcomputer 11 invalidates the setting values of the current register for contrast setting. As described above, the setting value of the current register for contrast setting is "high". The microcomputer 11 invalidates the setting value "high". Subsequently, the microcomputer 11 sets a value specifying the contrast of the background image 21 in the register for contrast setting based on the image data of the opening image 26 stored in the flash memory 13. For example, as shown in FIG. 4, the opening image 26 is an approximately black image, and the contrast of the opening image 26 is approximately low. Therefore, the contrast of the background image 21 is set to a low value in accordance with the contrast of the opening image 26. In this way, the microcomputer 11 sets "low" as the value specifying the contrast in the register for contrast setting.

For example, when the contrast of the opening image 26 is high, the contrast of the background image 21 is set to a high value in accordance with the contrast of the opening image 26. In this case, the microcomputer 11 sets "high" in the register for contrast setting. That is, the image to be set in the register for contrast setting is not limited to "low".

A value (initial value) of contrast set in accordance with the contrast of the opening image 26 before shipment of the information processing apparatus 1 may be stored in the sub-storage unit of the microcomputer 11. In this case, in the processing of S14, the microcomputer 11 may invalidate the setting values in the current register for contrast setting, and set the initial value in the register for contrast setting.

After the processing of S13 and processing of S14 are performed, in the video IC 12, the background image drawing unit 126 draws a background image based on the values set in the register for background setting and the register for contrast setting, that is, "black image" and "low", and outputs the background image to the combining circuit 127.

Next, the microcomputer 11 instructs the video IC 12 to draw the opening image 26 (S15). In response to this instruction, in the video IC 12, the read unit 122 acquires the image data of the opening image 26 from the flash memory 13 through the SPI circuit 121. Then, the read unit 122 supplies the acquired image data of the opening image 26 to the combining circuit 127.

The combining circuit 127 combines the background image 21 and the opening image 26 such that the opening image 26 supplied from the read unit 122 is superimposed on the background image 21 output from the background image drawing unit 126. Then, the combining circuit 127 outputs the combined screen data to the display drive circuit 128. The display drive circuit 128 converts the combined screen data into data that matches a predetermined interface, and outputs the data to the display device 14.

As a result, in the processing according to the present embodiment, as shown in FIG. 4A, an image in which the opening image 26 is superimposed on the background image 21 is displayed on the screen 20 of the display unit 142 of the display device 14. The opening image 26 is approximately black, and the background image 21 is also black. Since the background image 21 is drawn based on the values ("black image" and "low") set in accordance with the color and contrast of the opening image 26, the background image 21 is in harmony with the opening image 26. That is, the screen 20 with a natural relationship between the opening image 26 and the background image 21 is displayed on the display unit 142 of the display device 14.

On the other hand, in the processing according to Comparative Example, the processing of S13 and the processing of S14 among the processing according to the present embodiment are not performed. Therefore, in the processing according to Comparative Example, the setting values of the current register for background setting and the register for contrast setting are maintained as they are without being invalidated. The setting value of the current register for background setting is a "black image", which is a value that matches the color of the opening image 26, but the setting value of the current register for contrast setting is a "high", which is a value that does not match the contrast of the opening image 26. Therefore, in the processing according to Comparative Example, as shown in FIG. 4B, the background image 22 is displayed in a very light black color. The background image 22 matches the color of the opening image 26, but does not match the contrast of the opening image 26, and thus is not in harmony with the opening image 26. That is, the screen 20 with an unnatural relationship between the opening image 26 and the background image 22 is displayed on the display unit 142 of the display device 14.

As described above, in the processing according to the present embodiment, the setting value of the current register for contrast setting, that is, the value of the register for contrast setting which is set by the user via the reception unit 15 is invalidated. Therefore, even when the setting value of the register for contrast setting is changed by the user to a value that does not match the contrast of the opening image 26, the video IC 12 can avoid drawing the background image 21 based on the setting value. Therefore, the screen 20 with a natural relationship between the opening image 26 and the background image 21 can be displayed on the display unit 142 of the display device 14. Further, in the processing according to the present embodiment, the setting value of the current register for background setting, that is, the value of the register for background setting which is set by the user via the reception unit 15 is invalidated. Therefore, even when the setting value of the register for background setting is changed by the user to a value that does not match the color of the opening image 26, the video IC 12 can avoid drawing the background image 21 based on the setting value. Therefore, the screen 20 with a natural relationship between the opening image 26 and the background image 21 can be displayed on the display unit 142 of the display device 14.

Next, the microcomputer 11 determines whether the display of the opening image 26 has been completed (S16). The opening image 26 is displayed on the display unit 142 of the display device 14 for a certain period of time immediately after the information processing apparatus 1 is powered on. Therefore, for example, the microcomputer 11 determines whether the display of the opening image 26 has been completed based on whether a predetermined period of time during which the opening image 26 is displayed has elapsed after the information processing apparatus 1 is powered on.

When the determination in S16 is that the display of the opening image 26 has been completed (determination of YES), the microcomputer 11 returns the register for contrast setting in the register group 124 to the setting value saved in the sub-storage unit of the microcomputer 11 via the I2C circuit 123 (S17). That is, the microcomputer 11 returns the setting value of the register for contrast setting to "high" which is the value before being invalidated.

Subsequently, the microcomputer 11 returns the register for background setting of the register group 124 to the setting value saved in the sub-storage unit via the I2C circuit 123 (S18). That is, the microcomputer 11 returns the setting value of the register for background setting to the "black image" which is the value before being invalidated. Then, the microcomputer 11 ends the processing related to the display of the background image 21 and the opening image 26.

In the information processing apparatus 1, when the display of the opening image 26 is completed, a menu image for providing contents such as video and sound is displayed on the screen 20 of the display unit 142 of the display device 14. The contrast and color of the menu image may be changed by the user via the reception unit 15 of the information processing apparatus 1. In the processing according to the present embodiment, when the display of the opening image 26 on the screen 20 of the display unit 142 of the display device 14 is completed, the setting value of the register for contrast setting is returned to the value before being invalidated. Accordingly, the video IC 12 draws the menu image displayed after the opening image 26 with the contrast which is set by the user. Therefore, it is possible to display the screen 20 including the menu image that does not give a sense of discomfort to the user on the display unit 142 of the display device 14. Further, in the processing according to the present embodiment, when the display of the opening image 26 on the screen 20 of the display unit 142 of the display device 14 is completed, the setting value of the register for background setting is returned to the value before being invalidated. As a result, the video IC 12 draws the menu image in the color which is set by the user. Therefore, it is possible to display the screen 20 including the menu image that does not give a sense of discomfort to the user on the display unit 142 of the display device 14.

Effects of Embodiment

As described above, in the information processing apparatus 1 of the present embodiment, when the opening image 26 is displayed on the screen 20 of the display device 14, the microcomputer 11 invalidates the setting value of the current register for contrast setting which is set by the user via the reception unit 15. Then, the video IC 12 draws the opening image 26 so as to superimpose the background image 21. Accordingly, even when the setting value of the current register for contrast setting is changed by the user to a value that does not match the contrast of the opening image 26, it is possible to avoid the video IC 12 from drawing the background image 21 based on the setting value. Therefore, the screen with a natural relationship between the opening image 26 and the background image 21 can be displayed on the display unit 142 of the display device 14.

In the information processing apparatus 1 of the present embodiment, when the opening image 26 is displayed on the screen 20 of the display unit 142 of the display device 14, the microcomputer 11 changes the setting value of the register for contrast setting to a value that matches the contrast of the opening image 26. Accordingly, the video IC 12 can draw the background image 21 based on the setting value of the register for contrast setting that matches the contrast of the opening image 26. Therefore, the background image 21 is in harmony with the contrast of the opening image 26, and the screen 20 with a more natural relationship between the opening image 26 and the background image 21 can be displayed on the display unit 142 of the display device 14.

In the information processing apparatus 1 of the present embodiment, when the display of the opening image 26 on the screen 20 of the display unit 142 of the display device 14 is completed, the microcomputer 11 returns the setting value of the register for contrast setting to the setting value of the register for contrast setting before being invalidated. Accordingly, the video IC 12 can draw the menu image displayed after the opening image 26 based on the setting value of the register for contrast setting which is set by the user via the reception unit 15. Therefore, it is possible to display the screen 20 including the menu image that does not give a sense of discomfort to the user on the display unit 142 of the display device 14.

In the information processing apparatus 1 of the present embodiment, when the opening image 26 is displayed on the screen 20 of the display unit 142 of the display device 14, the microcomputer 11 invalidates the setting value of the register for background setting which is set by the user via the reception unit 15. Then, the video IC 12 draws the opening image 26 so as to superimpose the background image 21. Accordingly, even when the setting value of the current register for background setting is changed by the user to a value that does not match the color of the opening image 26, it is possible to avoid the video IC 12 from drawing the background image 21 based on the setting value. Therefore, the screen 20 with a natural relationship between the opening image 26 and the background image 21 can be displayed on the display unit 142 of the display device 14.

In the information processing apparatus 1 of the present embodiment, when the opening image 26 is displayed on the screen 20 of the display unit 142 of the display device 14, the microcomputer 11 changes the setting value of the register for background setting to a value that matches the color of the opening image 26. Accordingly, the video IC 12 can draw the background image 21 based on the setting value of the register for background setting that matches the color of the opening image 26. Therefore, the background image 21 is in harmony with the color of the opening image 26, and the screen 20 with a more natural relationship between the opening image 26 and the background image 21 can be displayed on the display unit 142 of the display device 14.

In the information processing apparatus 1 of the present embodiment, when the display of the opening image 26 on the screen 20 of the display unit 142 of the display device 14 is completed, the microcomputer 11 returns the setting value of the register for background setting to the setting value of the register for background setting before being invalidated. Accordingly, the video IC 12 can draw the menu image displayed after the opening image 26 based on the setting value of the register for background setting which is set by the user via the reception unit 15. Therefore, it is possible to display the screen 20 including the menu image that does not give a sense of discomfort to the user on the display unit 142 of the display device 14.

In addition, the information processing apparatus 1 of the present embodiment includes the reception unit 15 that receives an input operation of the user. This allows the user to set the contrast and color of the background image 21 via the reception unit 15. Therefore, the screen 20 of the background image 21 having the contrast and the color desired by the user can be displayed on the display unit 142 of the display device 14.

Modification

In the embodiment described above, the microcomputer 11 invalidates these setting values immediately after saving the setting values of the current register for background setting and register for contrast setting, but the present invention is not limited thereto. For example, after saving the setting values of the current register for background setting and register for contrast setting, the microcomputer 11 may determine whether these setting values are different from the initial values, that is, the values set in accordance with the opening image 26. When these setting values are different from the initial values, the microcomputer 11 may invalidate these setting values. On the other hand, when these setting values are the same as the initial values, the microcomputer 11 may hold the setting values as they are. Accordingly, the microcomputer 11 does not need to set the values of the register for background setting and the register for contrast setting based on the image data of the opening image 26 stored in the flash memory 13.

In the embodiment described above, the setting values of the register for background setting and the register for contrast setting are changed to values that match the color and contrast of the opening image 26 (OSD image), but the present invention is not limited thereto. For example, these setting values may be changed to a color approximate to the OSD image and a contrast value approximate to the OSD image, instead of the same color as the OSD image and the same contrast value as the OSD image. That is, as long as the relationship between the OSD image and the background image is natural, the setting values of the register for background setting and the register for contrast setting may be changed to any values.

The invention claimed is:

1. An information processing apparatus, comprising:
a controller configured to, at a timing when an on-screen display image is displayed on a screen of a display device on which a background image is being displayed, automatically change a contrast value of the background image from a first contrast value set by a user to a second contrast value different from the first contrast value, and draw the on-screen display image so as to be superimposed on the background image based on the second contrast value, wherein
at the timing when the on-screen display image is displayed on the screen of the display device on which the background image is being displayed, the controller sets the second contrast value to match a contrast of the on-screen display image.

2. The information processing apparatus according to claim 1, further comprising:
a receiver configured to receive an input, wherein the first contrast value is set by the user with the receiver.

3. The information processing apparatus according to claim 2, wherein,
when completing displaying of the on-screen display image on the screen of the display device, the controller changes the contrast value to the first contrast value.

4. The information processing apparatus according to claim 3, wherein,
at the timing when the on-screen display image is displayed on the screen of the display device on which the background image is being displayed, the controller changes a color value of the background image from a first color value set by the user to a second color value different from the first color value, and draws the on-screen display image so as to be superimposed on the background image based on the second color value.

5. The information processing apparatus according to claim 2, wherein,
at the timing when the on-screen display image is displayed on the screen of the display device on which the background image is being displayed, the controller changes a color value of the background image from a first color value set by the user to a second color value different from the first color value, and draws the on-screen display image so as to be superimposed on the background image based on the second color value.

6. The information processing apparatus according to claim 1, wherein,
when completing displaying of the on-screen display image on the screen of the display device, the controller changes the contrast value to the first contrast value.

7. The information processing apparatus according to claim 6, wherein,
at the timing when the on-screen display image is displayed on the screen of the display device on which the background image is being displayed, the controller changes a color value of the background image from a first color value set by the user to a second color value different from the first color value, and draws the on-screen display image so as to be superimposed on the background image based on the second color value.

8. The information processing apparatus according to claim 1, wherein,
at the timing when the on-screen display image is displayed on the screen of the display device on which the background image is being displayed, the controller changes a color value of the background image from a first color value set by the user to a second color value different from the first color value, and draws the on-screen display image so as to be superimposed on the background image based on the second color value.

9. The information processing apparatus according to claim 8, wherein,
when the on-screen display image is displayed on the screen of the display device on which the background image is being displayed, the controller sets the second color value to match a color of the on-screen display image.

10. The information processing apparatus according to claim 8, wherein,
when completing displaying of the on-screen display image on the screen of the display device, the controller changes the color value of the background image to the first color value.

11. The information processing apparatus according to claim 1, wherein
the controller is configured to display the background image on the screen of the display device with the first contrast value set by the user when the on-screen display image is not displayed on the screen.

12. An information processing method for displaying, by a controller, an on-screen display image on a screen of a display device; the information processing method comprising:

changing, by the controller, at a timing when the on-screen display image is displayed on the screen of the display device on which a background image is being displayed, a contrast value of the background image from a first contrast value set by a user to a second contrast value different from the first contrast value;

drawing, by the controller, the on-screen display image on the screen of the display device on which the background image is being displayed, so as to be superimposed on the background image based on the second contrast value; and at the timing when the on-screen display image is displayed on the screen of the display device on which the background image is being displayed, setting, by the controller, the second contrast value to match a contrast of the on-screen display image.

* * * * *